US012703124B2

(12) United States Patent
Thai et al.

(10) Patent No.: US 12,703,124 B2
(45) Date of Patent: Aug. 11, 2026

(54) TOOLING ELEMENT AND METHODS FOR FORMING AND USING SAME

(71) Applicant: Rohr, Inc., Chula Vista, CA (US)

(72) Inventors: Bryan Thai, Poway, CA (US); Joseph R. Lemanski, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 71 days.

(21) Appl. No.: 18/800,793

(22) Filed: Aug. 12, 2024

(65) Prior Publication Data

US 2024/0399624 A1 Dec. 5, 2024

Related U.S. Application Data

(62) Division of application No. 17/473,241, filed on Sep. 13, 2021, now Pat. No. 12,059,823.

(51) Int. Cl.

| | |
|---|---|
| ***B29C 33/38*** | (2006.01) |
| ***B29C 33/50*** | (2006.01) |
| ***B29C 33/54*** | (2006.01) |
| ***B29L 31/00*** | (2006.01) |

(52) U.S. Cl.

CPC ........ *B29C 33/3821* (2013.01); *B29C 33/505* (2013.01); *B29C 33/54* (2013.01); *B29K 2995/0046* (2013.01); *B29K 2995/0069* (2013.01); *B29L 2031/757* (2013.01)

(58) Field of Classification Search

None

See application file for complete search history.

(56) References Cited

U.S. PATENT DOCUMENTS

| | | | | |
|---|---|---|---|---|
| 1,572,936 A * | 2/1926 | Kemp | B29C 33/52 | 264/316 |
| 3,629,030 A * | 12/1971 | Ash | B29C 70/446 | 264/572 |
| 3,651,180 A * | 3/1972 | Gluerckert | B29C 44/445 | 425/389 |
| 3,964,534 A | 6/1976 | Rabinowitz | | |
| 4,828,639 A * | 5/1989 | Aker | B32B 37/10 | 425/405.2 |
| 5,262,121 A * | 11/1993 | Goodno | B29C 33/3821 | 264/225 |
| 5,374,388 A | 12/1994 | Frailey | | |
| 5,932,046 A * | 8/1999 | Yates | A47B 21/0371 | 156/77 |
| 6,780,352 B2 * | 8/2004 | Jacobson | B29C 33/3821 | 264/108 |
| 7,052,572 B2 * | 5/2006 | Miura | B29C 70/44 | 156/286 |
| 7,172,714 B2 * | 2/2007 | Jacobson | B29C 33/3821 | 264/108 |

(Continued)

FOREIGN PATENT DOCUMENTS

| | | |
|---|---|---|
| GB | 2284173 A | 1/1994 |
| WO | 2003064130 A1 | 8/2003 |
| WO | 2010069083 A1 | 6/2010 |

*Primary Examiner* — Emmanuel S Luk

(74) *Attorney, Agent, or Firm* — Getz Balich LLC

(57) ABSTRACT

A tooling element includes a flexible sleeve defining an interior cavity. The flexible sleeve includes a sealable access port extending through the flexible sleeve from the interior cavity to an exterior of the flexible sleeve. The tooling element further includes vacuum-packed tooling particulate disposed within and filling the interior cavity of the flexible sleeve.

14 Claims, 9 Drawing Sheets

(56) References Cited

U.S. PATENT DOCUMENTS 7,217,380 B2* 5/2007 Longo .................... B29C 33/54 141/10
7,638,080 B2* 12/2009 Backhouse .......... B29C 70/446 442/164
7,758,793 B2* 7/2010 Grankall ............ B29C 33/3821 264/DIG. 44
8,377,248 B2* 2/2013 Coleman .............. B29C 70/443 264/510
8,906,489 B2* 12/2014 Jacob ..................... B29C 70/34 428/178
9,138,919 B2* 9/2015 Morris ................. B29C 70/446
9,387,604 B2* 7/2016 Cavaliere ........... B29C 33/3821
10,207,463 B2* 2/2019 Jacob ................ B29D 99/0014
11,780,178 B2* 10/2023 Parkinson .............. B29C 53/40 156/242
11,787,141 B2 10/2023 Hanson
12,208,585 B2* 1/2025 Santiago ................ B29C 70/34
2002/0195220 A1* 12/2002 Jacobson ........... B29C 33/3821 164/15
2004/0105970 A1 6/2004 Thompson
2005/0035477 A1* 2/2005 Jacobson ........... B29C 33/3821 264/108
2007/0080481 A1* 4/2007 Kismarton ........... B29C 70/446 425/389
2009/0087599 A1* 4/2009 Cheng .................. B29C 33/505 428/34.1
2009/0152775 A1* 6/2009 Grankall .............. B29C 33/505 425/436 RM
2009/0166935 A1 7/2009 Jacob
2009/0309268 A1* 12/2009 Cavaliere ............... F16K 27/04 264/511
2011/0042863 A1* 2/2011 Cavaliere .......... B29D 99/0007 425/470
2013/0187314 A1* 7/2013 Aravamudan .......... B29C 43/10 425/89
2013/0264460 A1 10/2013 Yamao
2014/0178520 A1 6/2014 Borland
2015/0183139 A1* 7/2015 Takano .................. B29C 33/54 264/219
2015/0273742 A1 10/2015 Takano
2016/0221229 A1* 8/2016 Baker .................... B29C 43/18
2016/0339682 A1* 11/2016 Bahe .................... B29C 70/342
2017/0210034 A1* 7/2017 Register ............... B29C 33/485
2018/0162074 A1* 6/2018 Takano .............. B29C 43/3642
2020/0023600 A1* 1/2020 Hanson ............... B29D 35/126
2020/0039156 A1* 2/2020 Wang ..................... B29C 33/40
2020/0101679 A1* 4/2020 Borland ................. B29C 33/02
2020/0122361 A1* 4/2020 Heath, III ............ B29C 33/405
2020/0122362 A1* 4/2020 Heath, III ............ B29C 70/446
2020/0207033 A1* 7/2020 Wang ................... B29C 70/446
2020/0238638 A1 7/2020 Toriyama
2021/0001571 A1* 1/2021 Santiago ............ B29C 33/3821
2022/0397861 A1 12/2022 Pinsker

* cited by examiner

TOOLING ELEMENT AND METHODS FOR FORMING AND USING SAME

This application is a divisional of U.S. patent application Ser. No. 17/473,241 filed Sep. 13, 2021, which is hereby incorporated herein by reference in its entirety.

BACKGROUND

1. Technical Field

This disclosure relates generally to forming composite structures, and more particularly to tooling for forming composite structures.

2. Background Information

Composite materials are frequently used in the aerospace industry for a diverse array of structural and dynamic aerostructural applications because of the strength-to-weight advantage provided by composite materials. Composite components may sometimes be positioned in contact with one another and subsequently cured (e.g., co-cured) to form a larger composite structure. The composite components may sometimes require structural support before, during, and/or after the curing process and manufacturers may use various types of tooling to provide support. "Trapped tooling" may be used to support interior surfaces of components or assembled component structures. However, trapped tooling may sometimes be difficult to removed from the cured composite structure.

In some cases, manufacturers have used sacrificial tooling where tooling may be trapped within the cured composite structure. Sacrificial tooling may include materials which can be "washed out" or "melted out" of the composite structure. However, the sacrificial tooling may still leave behind residue (e.g., binder) which can be difficult to remove from composite materials. Further, the sacrificial tooling material may not be readily reused after it has been washed out, melted out, or otherwise removed from the composite structure. Further still, when forming large composite structures, the necessary tooling may be very heavy, making positioning of the composite components and tooling more difficult. Accordingly, what is needed are improved tooling apparatuses, systems, and methods which address one or more of the above-noted concerns.

SUMMARY

It should be understood that any or all of the features or embodiments described herein can be used or combined in any combination with each and every other feature or embodiment described herein unless expressly noted otherwise.

According to an aspect of the present disclosure, a tooling element includes a flexible sleeve defining an interior cavity. The flexible sleeve includes a sealable access port extending through the flexible sleeve from the interior cavity to an exterior of the flexible sleeve. The tooling element further includes vacuum-packed tooling particulate disposed within and filling the interior cavity of the flexible sleeve.

In any of the aspects or embodiments described above and herein, the tooling particulate may include a first tooling particulate and a second tooling particulate which is different than the first tooling particulate.

In any of the aspects or embodiments described above and herein, the first tooling particulate has a first density, and the second tooling particulate has a second density which may be different than the first density.

In any of the aspects or embodiments described above and herein, the tooling particulate may include one or more hollow geometric vessels.

In any of the aspects or embodiments described above and herein, the tooling particulate may include one or more expandable balloons.

In any of the aspects or embodiments described above and herein, the flexible sleeve may be a rubber sleeve In any of the aspects or embodiments described above and herein, the flexible sleeve may include a tooling face and the tooling element may further include a support sheet in contact with the flexible sleeve to support the tooling face of the flexible sleeve.

In any of the aspects or embodiments described above and herein, the support sheet may be disposed within the interior cavity.

In any of the aspects or embodiments described above and herein, the support sheet may be imbedded within the flexible sleeve along all or a portion of the tooling face.

In any of the aspects or embodiments described above and herein, the interior cavity of the flexible sleeve may be substantially free of air.

In any of the aspects or embodiments described above and herein, the tooling element may further include an access port seal disposed within the sealable access port.

According to another aspect of the present disclosure, a method for forming a tooling element includes providing a flexible sleeve defining an interior cavity, packing the flexible sleeve with tooling particulate by inserting the tooling particulate into the interior cavity of the flexible sleeve through a sealable access port, and removing air from the interior cavity of the flexible sleeve through the sealable access port to form the tooling element as a rigid tooling structure.

In any of the aspects or embodiments described above and herein, the method may further include sealing the sealable access port with an access port seal.

In any of the aspects or embodiments described above and herein, the method may further include inserting a support sheet into the interior cavity of the flexible sleeve to support a tooling face of the flexible sleeve.

In any of the aspects or embodiments described above and herein, the method may further include forming the flexible sleeve with a support sheet imbedded within the flexible sleeve along all or a portion of a tooling face of the flexible sleeve.

In any of the aspects or embodiments described above and herein, the step of packing the flexible sleeve with the tooling particulate may include applying vibration to the flexible sleeve.

In any of the aspects or embodiments described above and herein, the method may further include positioning the flexible sleeve within a tooling mold prior to the step of packing the flexible sleeve with the tooling particulate.

According to another aspect of the present disclosure, a method for forming a composite structure includes providing at least one tooling element. The at least one tooling element includes a flexible sleeve defining an interior cavity. The flexible sleeve includes a sealable access port extending through the flexible sleeve from the interior cavity to an exterior of the flexible sleeve. The at least one tooling element further includes vacuum-packed tooling particulate disposed within and filling the interior cavity of the flexible sleeve. The method further includes supporting at least one composite component by positioning the at least one tooling element in contact with the at least one composite component and curing the at least one composite component to form the composite structure.

In any of the aspects or embodiments described above and herein, the method may further include unsealing the at least one tooling element and removing at least a portion of the tooling particulate subsequent to the step of curing the at least one composite component.

In any of the aspects or embodiments described above and herein, the method may further include removing the at least one tooling element from contact with the composite structure subsequent to the step of unsealing the at least one tooling element and removing at least a portion of the tooling particulate.

The present disclosure, and all its aspects, embodiments and advantages associated therewith will become more readily apparent in view of the detailed description provided below, including the accompanying drawings.

DETAILED DESCRIPTION

Figure 1:
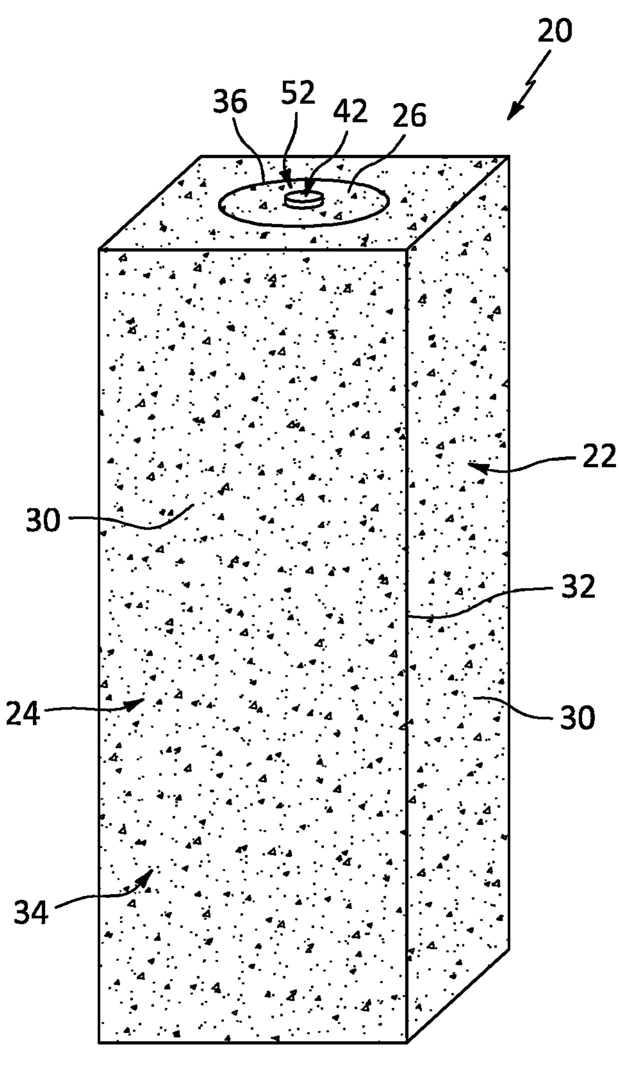
FIG. 1 illustrates a perspective view of a tooling element, in accordance with one or more embodiments of the present disclosure.

The present disclosure is directed to tooling elements. As will be clear from the description below, the present disclosure tooling elements can be used as tooling in the formation of a wide variety of components and structures such as, but not limited to, composite structures for an aircraft. The present disclosure additionally includes methods for forming tooling elements and for using tooling elements to form structures.

Referring to FIGS. 1-5, tooling element 20 embodiments according to the present disclosure include a sleeve 22, tooling particulate 24, and an access port seal 26. As will be described herein, some embodiments of the sealing device 20 may further include a support sheet 28.

The sleeve 22 is a flexible sleeve made from a material(s) with sufficient elastic flexibility to permit the sleeve 22 to conform to a desired tooling shape, and one with sufficient impermeability to prevent any meaningful air and/or fluid (hereinafter "air") passage through the sleeve 22 material. The sleeve 22 includes at least one tooling face 30 defining an exterior surface of the sleeve 22 configured to contact and support a portion of at least one component, as will be discussed below in further detail. The at least one tooling face 30 may be substantially planar as illustrated, for example, in FIGS. 1 and 5. The sleeve 22 may assume a variety of different geometries and the at least one tooling face 30 may include varying degrees of curvature, as necessary to conform to and/or support at least one component (see, e.g., FIGS. 10 and 11). Accordingly, the present disclosure is not limited to any particular shape or configuration of the at least one tooling face 30 and the at least one tooling face 30 may be customized to conform to and/or support a variety of components having complex geometrical configurations. The sleeve 22 may further include at least one edge 32 defined by an intersection of two or more tooling faces 30. The sleeve 22 surrounds and defines an interior cavity 34. The sleeve 22 further includes a sealable access port 36 extending through the sleeve 22 from the interior cavity 34 and an exterior of the sleeve 22.

The sleeve 22 is not limited to any particular material or combination of materials, but a material that can provide sufficient flexibility while withstanding the relatively high pressures and temperatures associated with tooling element 20 formation and component curing, as will be discussed below in further detail, are preferred. For example, in some embodiments, the material of the sleeve 22 may have a hardness between 20 and 80 on the Shore A hardness scale. Non-limiting examples of sleeve 22 materials include silicon, elastomeric materials, polymeric materials such as a thermoplastic material, rubber and synthetic rubber materials such as ethylene propylene diene monomer (EPDM) rubber or VITON manufactured by CHEMOURS, and the like.

The tooling element 20 includes the tooling particulate 24 disposed within and filling or substantially filling the interior cavity 34 of the sleeve 22. As will be discussed in further detail, the tooling particulate may be vacuum-packed within the sleeve 22. The vacuum-packed tooling particulate 24 and surrounding sleeve 22 defines a sufficiently rigid structure to provide structural support for the tooling element 20 including, for example, the at least one tooling face 30. The particular composition of the tooling particulate 24 (e.g., the tooling particulate 24 material) may be selected based on the particular application for the tooling element 20. In one example, it may be desirable for the at least one tooling face 30 of the tooling element 20 to provide a relatively smooth exterior surface for contact with a component. Accordingly, a relatively fine (e.g., smaller) particulate may be selected for the tooling particulate 24. In another example, the tooling element 20 may be relatively large in order to support a similarly large component. Accordingly, it may be desirable to select a tooling particulate 24 having a relatively low average density in order to reduce the weight of the tooling element 20. Accordingly, the tooling particulate 24 of the present disclosure is not limited to a particular material of the tooling particulate 24. Non-limiting examples, of tooling particulate 24 materials include sand, salt, metallic or glass beads, hollow fixed-volume spheres or other shapes (hereinafter referred to as "hollow geometric vessels"), expandable balloons and/or fillers such as EXPANCEL microspheres manufactured by NOURYON, and the like. In some embodiments, expandable balloons and/or fillers may be included in the tooling particulate 24 to provide additional internal pressure within the sleeve 22.

Figure 2:
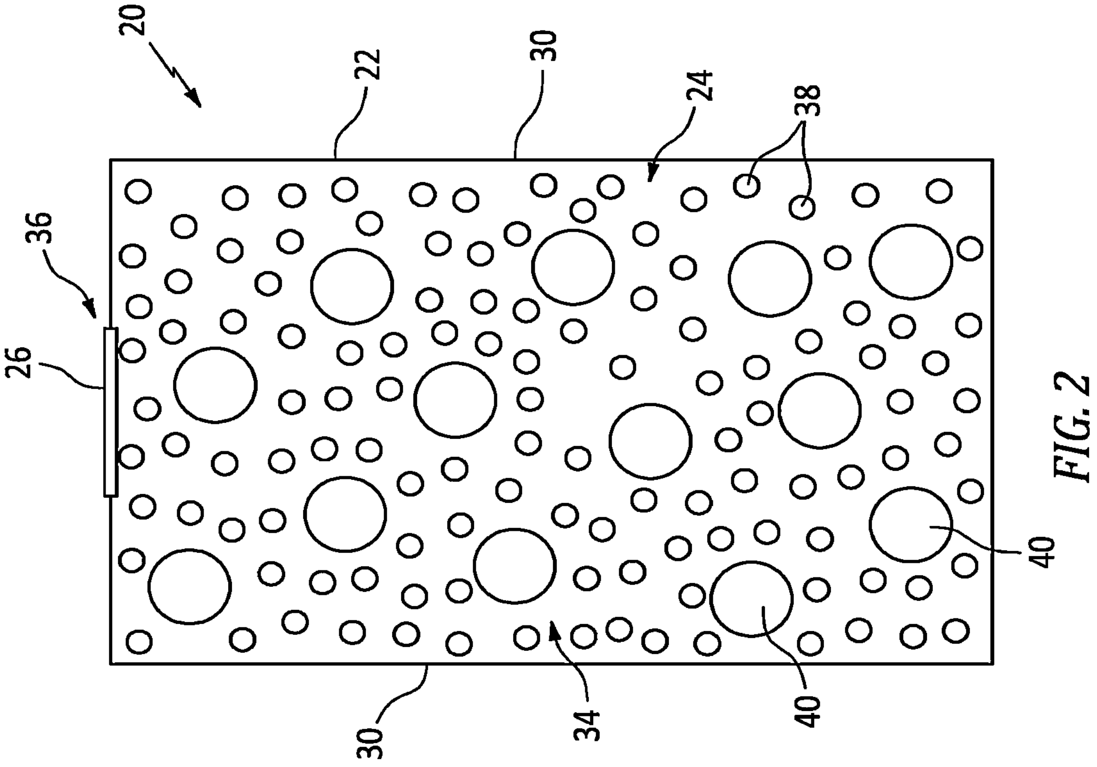
FIG. 2 illustrates a cross-sectional side view of a tooling element, in accordance with one or more embodiments of the present disclosure.

In some embodiments, the tooling particulate 24 may include a combination of multiple different tooling particulate 24 materials. As shown in FIG. 2 for example, the tooling particulate 24 may include a first tooling particulate 38 and a second tooling particulate 40 which is different than the first tooling particulate 38. The different tooling particulate 24 materials may be selected to provide the desired tooling element 20 rigidity and weight, the at least one tooling face 30 smoothness, and other characteristics of the tooling element 20. In some embodiments, the first tooling particulate 38 may have a first density which is different than a second density of the second tooling particulate 40. For example, a relatively fine particulate material may be selected as the first tooling particulate 38 in order to provide a smooth exterior surface of the at least one tooling face 30, while a relatively light particulate material (e.g., a hollow geometric vessel) may be selected as the second tooling particulate 40 in order to reduce the average density of the tooling particulate 24 and, hence, the weight of the tooling element 20.

The tooling element 20 includes the access port seal 26 disposed within the access port 36 of the sleeve 22 and configured to selectively seal the access port 36. The access port seal 26 may be selectively installed and removed from the access port 36 to allow the packing of the tooling particulate 24 into the sleeve 22 and the removal of the tooling particulate 24 from the sleeve 22. Engagement between the access port seal 26 and the access port 36 of the sleeve 22 is not limited to any particular means. In some embodiments, the access port seal 26 may be an adhesive seal configured to selectively adhere to the sleeve 22 and cover the access port 36. In some embodiments, the access port seal 26 may be defined, for example, by interlock scaling features of the sleeve 22. In some embodiments, the access port 36 may be defined by a rigid or semi-rigid access port structure surrounding the access port 36 and configured for engagement (e.g., threaded engagement) with the access port seal 26. As will be discussed in further detail below, air may be selectively withdrawn from and/or returned to the interior cavity 34 during the preparation and use of the tooling element 20. The access port seal 26 may include features which allow the flow of air therethrough, for example, into or out of the interior cavity 34. For example, the access port seal 26 may include an air passage 42 to permit the removal of air from the interior cavity 34 or to break vacuum in the interior cavity 34 with the access port seal 26 installed. In some embodiments, the air passage 42 may include an air valve 52 which is operable between an actuated position and an unactuated position. In the unactuated position, the air valve 52 may allow air to be withdrawn from the interior cavity 34 via the air passage 42 but may not allow air to re-enter the interior cavity 34 via the air passage 42. In the actuated position, the air valve 52 may allow air to re-enter the interior cavity 34 via the air passage 42, thereby substantially equalizing the air pressure inside and outside the interior cavity 34.

Figure 3:
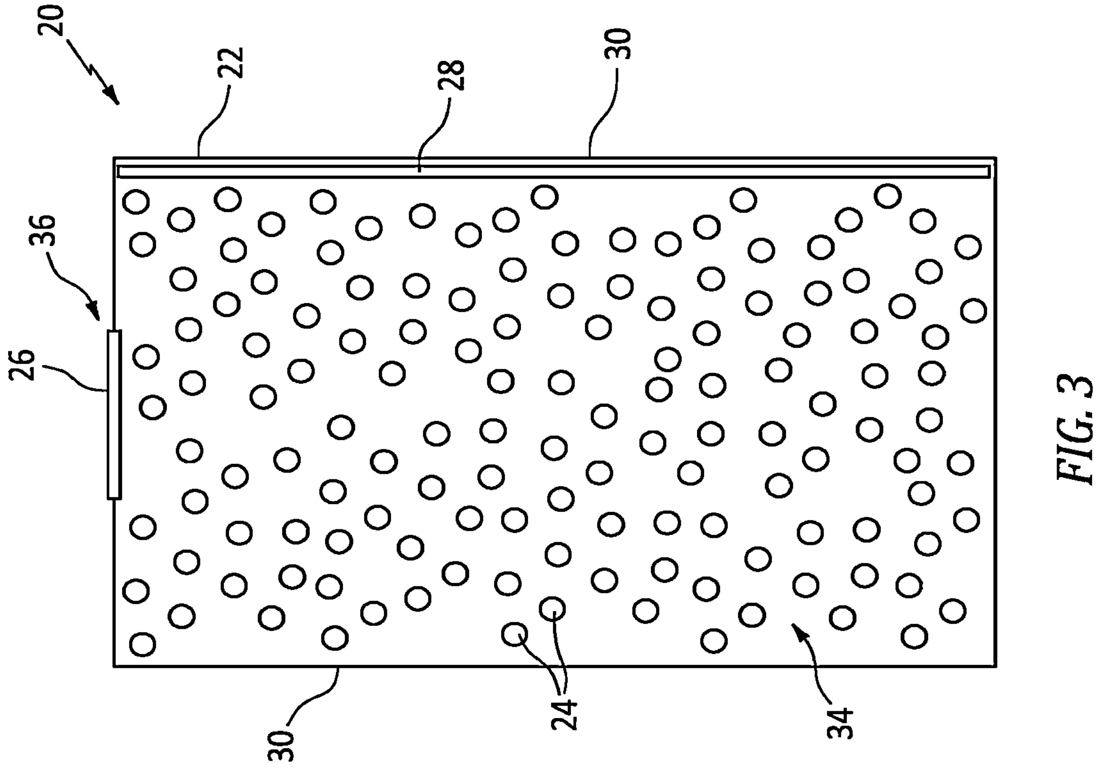
FIG. 3 illustrates a cross-sectional side view of a tooling element, in accordance with one or more embodiments of the present disclosure.
Figures 4, 5:
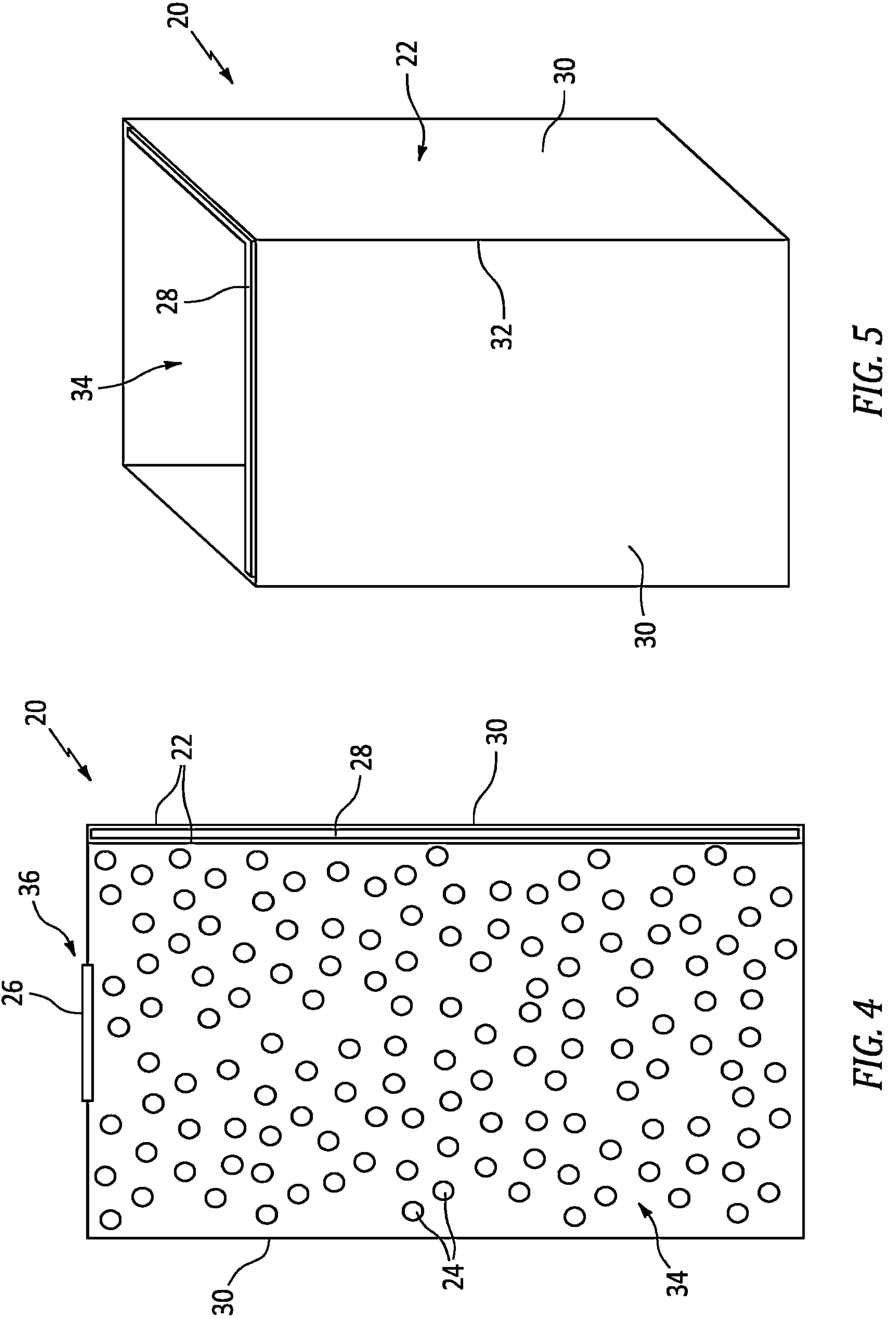
FIG. 4 illustrates a cross-sectional side view of a tooling element, in accordance with one or more embodiments of the present disclosure.
FIG. 5 illustrates a cutaway perspective view of a tooling element with a top portion of the tooling element and the tooling particulate removed, in accordance with one or more embodiments of the present disclosure.

In some embodiments, the tooling element 20 may include the support sheet 28 in contact with the sleeve 22 in order to provide support to one or more tooling faces of the at least one tooling face 30 of the sleeve 22. A tooling face supported by the support sheet 28 may additionally provide a greater exterior surface smoothness in comparison to a tooling face supported only by the tooling particulate 24. As shown in FIGS. 3 and 5, for example, the support sheet 28 may be disposed within the interior cavity 34 and in contact with an interior surface of the sleeve 22 along all or a portion of one or more tooling faces of the at least one tooling face 30. As shown in FIG. 4, for example, the support sheet 28 may be imbedded within the sleeve 22 (e.g., substantially surrounded by the sleeve 22 material and located outside of the interior cavity 34) along all or a portion of a tooling face of the at least one tooling face 30. In some embodiments, the support sheet 28 may be substantially coextensive with one or more tooling faces of the at least one tooling face 30. As shown in FIG. 5, the support sheet 28 may additionally define and/or support an edge of the at least one edge 32. The support sheet 28 may be made from any suitable material with sufficient rigidity and strength to support the at least one tooling face 30 while forming a composite structure including, but not limited to, metal, fiber glass, high-temperature resistant plastics, etc.

In the present disclosure tooling element 20, the interior cavity 34 is substantially free of air such that the tooling particulate 24 is vacuum-packed within the sleeve 22. Removal of the air from the interior cavity 34 causes the flexible sleeve 22 to pull inward toward the interior cavity 34, thereby pulling against and tightly retaining the tooling particulate 24 and forming the rigid tooling element 20. As used herein, the term "substantially free of air" means that a sufficient quantity of air has been withdrawn from the interior cavity 34 (e.g., a sufficient vacuum has been established within the interior cavity 34) so that the tooling element 20 is sufficiently rigid to function as tooling for the support and formation of composite components and structures. Sufficient vacuum may be established within the interior cavity 34, for example, when a differential pressure between the interior cavity 34 and the atmosphere surrounding the tooling element 20 is greater than about 14 pounds per square inch (PSI). In some embodiments, sufficient vacuum may be established by a differential pressure between the interior cavity 34 and the atmosphere surrounding the tooling element 20 which is greater than about 14.5 PSI. In some embodiments, sufficient vacuum may be established by a differential pressure between the interior cavity 34 and the atmosphere surrounding the tooling element 20 which is approximately 14.7 PSI. The tooling element 20 may be considered "sufficiently rigid" when the tooling element 20 has sufficient structural strength to not deflect or to only minimally deflect. In such a "sufficiently rigid" condition, the sleeve 22 and the tooling particulate 24 may be positionally fixed relative to one another.

Figure 6:
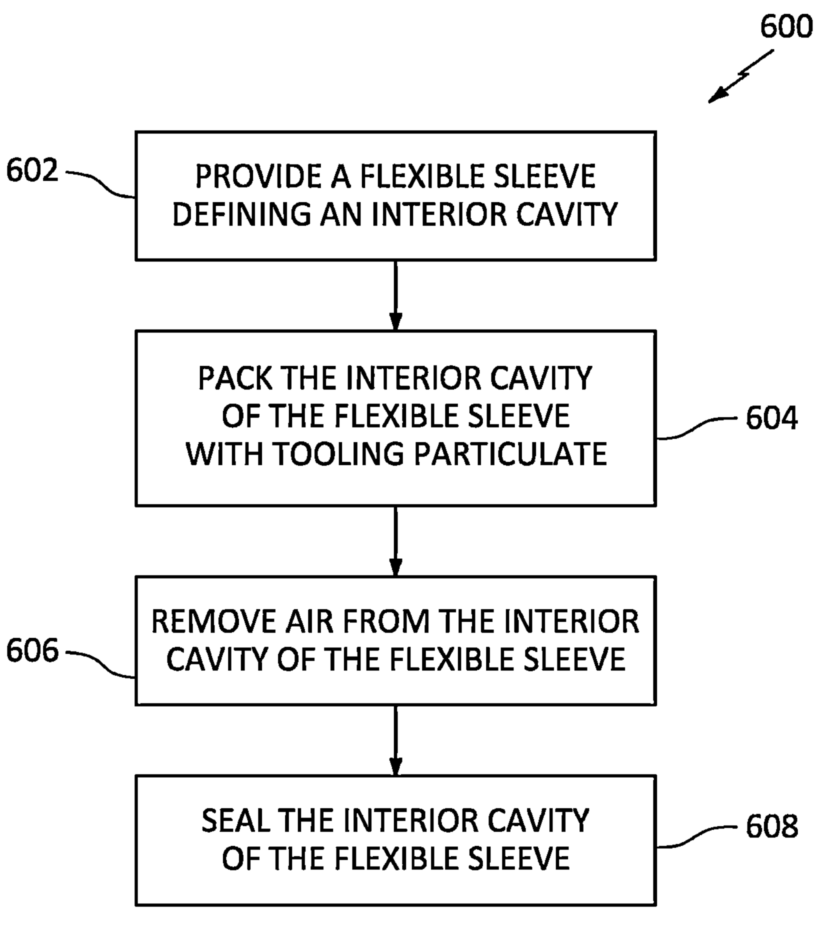
FIG. 6 illustrates a flowchart of a method for forming a tooling element, in accordance with one or more embodiments of the present disclosure.
Figure 8:
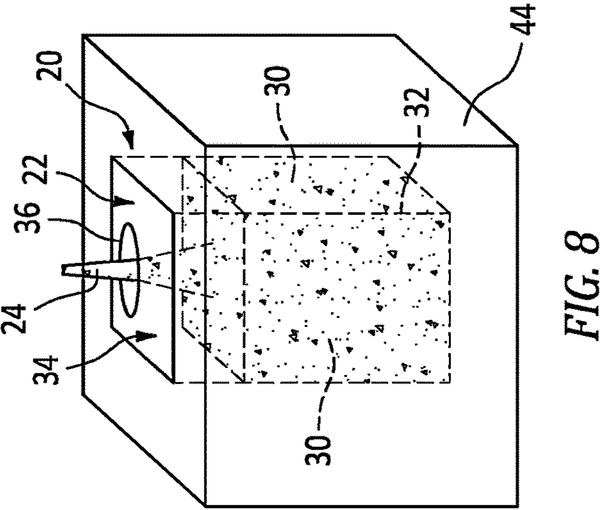
FIG. 8 illustrates a perspective view of a tooling element at a stage of formation and disposed within a tooling mold, in accordance with one or more embodiments of the present disclosure.
Figure 7:
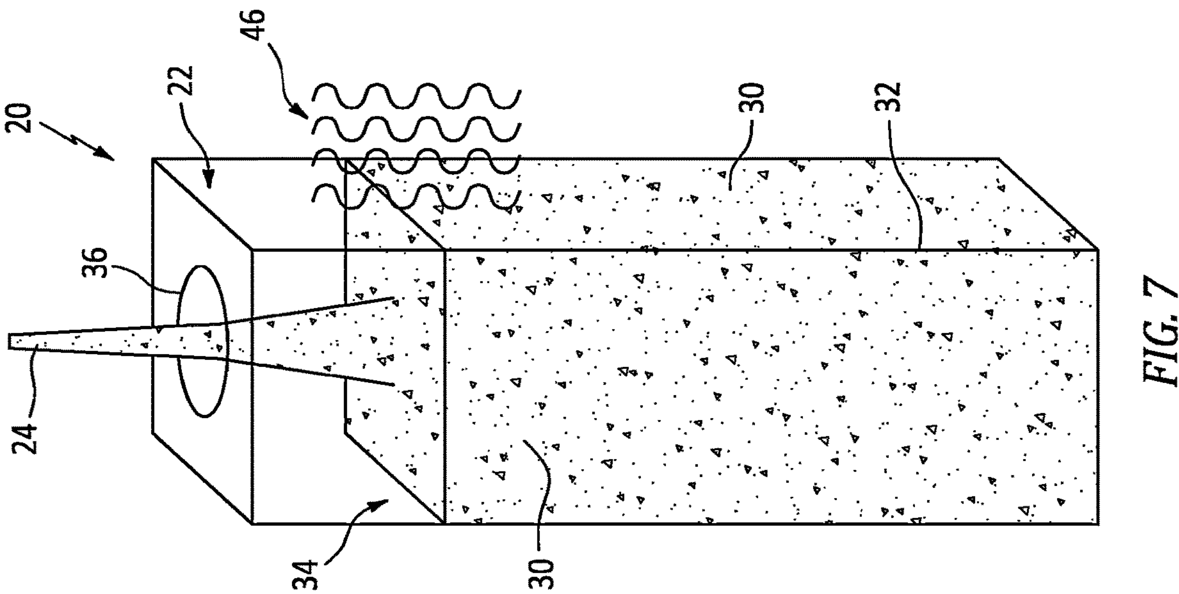
FIG. 7 illustrates a perspective view of a tooling element at a stage of formation, in accordance with one or more embodiments of the present disclosure.

Referring to FIGS. 6-8, the present disclosure includes a method 600 for forming a tooling element, such as the tooling element 20, as shown in the flow charted illustrated in FIG. 6. Unless otherwise noted herein, it should be understood that the steps of method 600 are not required to be performed in the sequence in which they are discussed below and steps of the method 600 may be performed separately or simultaneously.

Step 602 includes providing the sleeve 22 including the interior cavity. In some embodiments, step 602 may include forming the sleeve 22. In some embodiments, the sleeve 22 may be formed by an injection molding process. In some other embodiments, the sleeve 22 may be formed by spraying the sleeve 22 material onto or into a sleeve molding tool which approximates the desired geometry of the tooling element 20. The sleeve 22 material may then be vulcanized or otherwise cured to form the sleeve 22. However, the present disclosure is not limited to any particular method for forming the sleeve 22. In some embodiments including the support sheet 28, step 602 may include inserting the support sheet 28 into the interior cavity 34 and positioning the support sheet relative to one more fore tooling faces of the at least one tooling face 30, as discussed above.

Step 604 includes packing the sleeve 22 with the tooling particulate 24 by inserting the tooling particulate 24 into the interior cavity 34 of the sleeve 22 through the access port 36. Packing the sleeve 22 with the tooling particulate 24 may include shaping the tooling element 20 by physically adjusting the shape and/or position of the sleeve 22 and/or tooling particulate 24. As shown in FIG. 8, in some embodiments, the sleeve 22 may be positioned within a tooling mold 44 during the step of packing the sleeve 22 with the tooling particulate 24 in order to support the at least one tooling face 30 of the tooling element 20 and to ensure that the tooling element 20 obtains the desired shape and surface smoothness. In some embodiments, the tooling mold 44 may be defined by one or more composite components prior to forming the one or more composite components into a composite structure. In other words, the sleeve 22 may be positioned within or otherwise in contact with one or more composite components, in order to control the shape of the tooling element 20, and subsequently packed with the tooling particulate 24.

When packing the sleeve 22 with the tooling particulate 24, one or more voids may be formed within the interior cavity 34. The formation of voids in the interior cavity 34 may subsequently result in defects in the shape of the tooling element 20 when the air is subsequently withdrawn from the interior cavity 34, thereby causing the voids to collapse and the tooling particulate 24 to shift. Accordingly, in some embodiments, step 604 may include applying a vibration (illustrated schematically in FIG. 7 as vibration 46) to the tooling element 20, during insertion of the tooling particulate 24 into the interior cavity 34, to improve packing and settling of the tooling particulate 24 within the interior cavity 34 and to prevent or minimize the formation of voids within the interior cavity 34. Different tooling particulate 24 materials and tooling element 20 shapes may be more or less susceptible to void formation. In some embodiments, the formation of voids while packing the sleeve 22 with tooling particulate 24 may not be a concern.

Step 606 includes removing air from the interior cavity 34 of the sleeve 22 through the access port 36 to form the tooling element 20 as a rigid tooling structure. Air may be removed from the interior cavity 34 until the interior cavity 34 is substantially free of air, as discussed above. In some embodiments, air may be removed from the interior cavity 34 of the sleeve 22 through the air passage 42 of the access port seal 26, as discussed above. Air may be removed from the interior cavity 34 using, for example, a pump, a vacuum device, etc. The present disclosure is not limited to any particular means of removing air from the interior cavity 34 of the sleeve 22. In some embodiments, some amount of air may be removed from the interior cavity 34 during the performance of step 604, described above, to assist in positioning of tooling particulate 24 within the interior cavity 34 and with shaping of the tooling element 20. Subsequently, a remainder of the air may be removed from the interior cavity 34 until the interior cavity 34 is substantially free of air.

Step 608 includes sealing the access port 36 of the sleeve 22 with the access port seal 26 to prevent the reintroduction of air into the interior cavity 34 and maintain the tooling element 20 in a substantially rigid condition. In some embodiments, the access port seal 26 may be installed subsequent to removing air from the interior cavity 34. In some other embodiments, the access port seal 26 may be installed subsequent to packing the interior cavity 34 with the tooling particulate but prior to removing air from the interior cavity 34 (e.g., through the air passage 42 of the access port seal 26), as discussed above with respect to Step 606.

Figure 9:
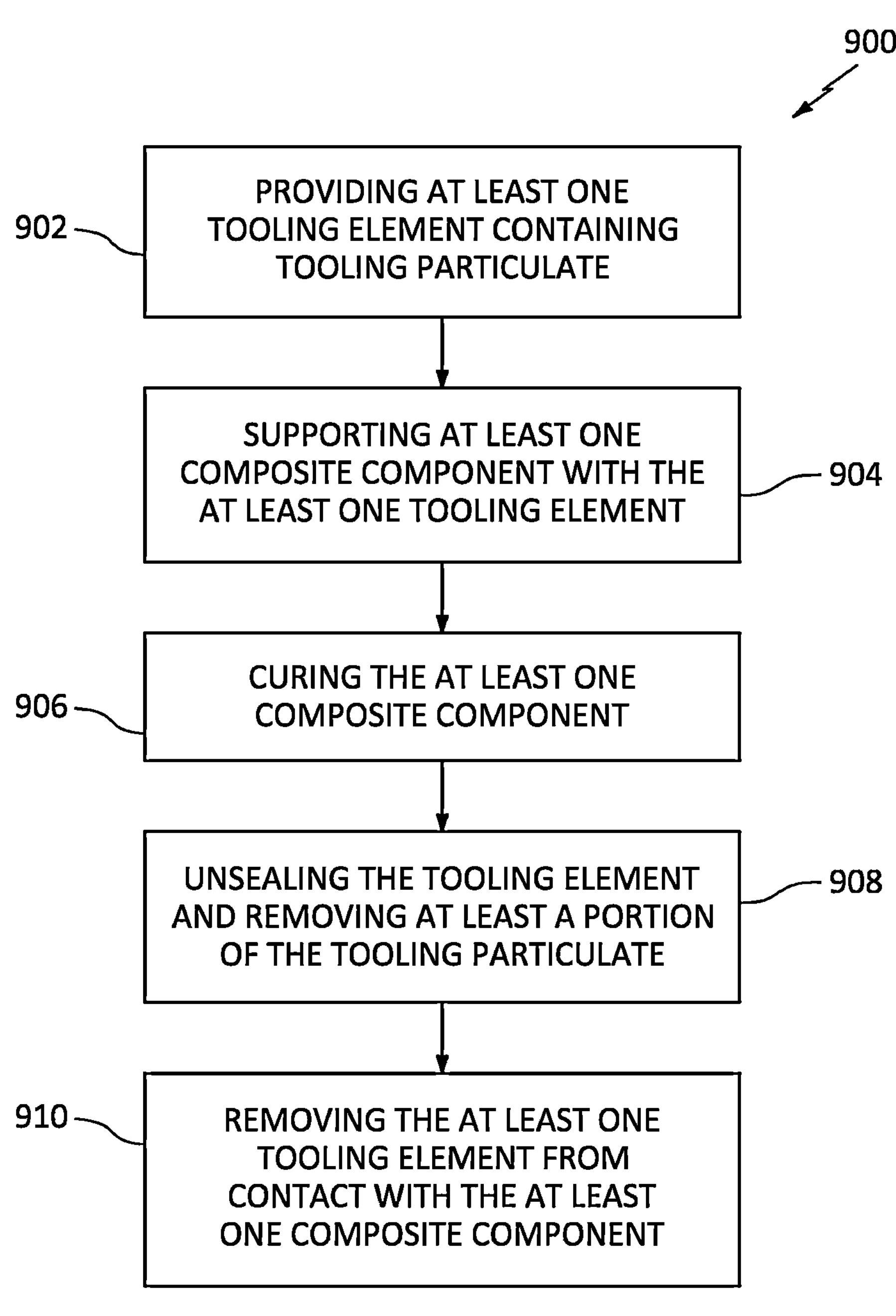
FIG. 9 illustrates a flowchart of a method for forming a composite structure, in accordance with one or more embodiments of the present disclosure.

Referring to FIGS. 9-12, the present disclosure includes a method 900 for forming a composite structure using at least one tooling element, such as the tooling element 20, as shown in the flow charted illustrated in FIG. 9. Unless otherwise noted herein, it should be understood that the steps of method 900 are not required to be performed in the sequence in which they are discussed below and steps of the method 900 may be performed separately or simultaneously.

Figure 10:
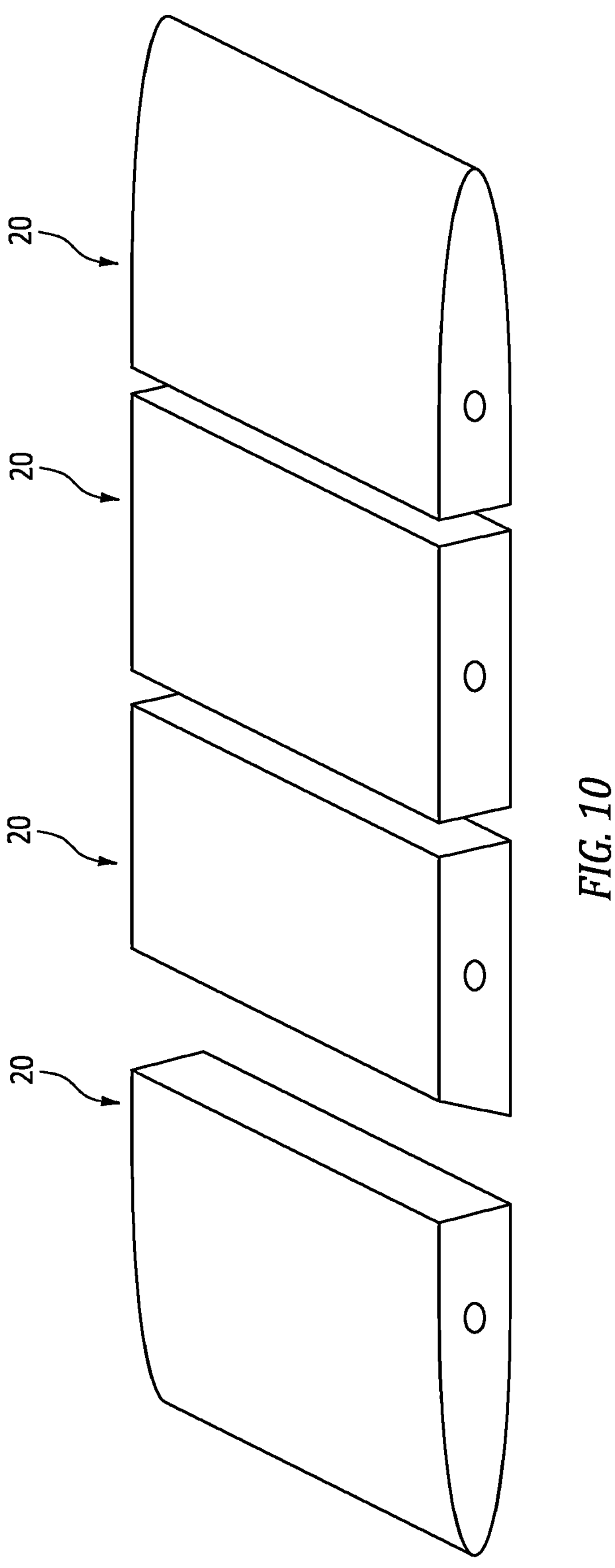
FIG. 10 illustrates a perspective view of a plurality of tooling elements, in accordance with one or more embodiments of the present disclosure.

Step 902 includes providing at least one tooling element, such as the tooling element 20 discussed above, for support of at least one composite component 48 used to form a composite structure 50. As shown in FIG. 10, a plurality of tooling elements 20 may be used for forming the composite structure 50.

Figure 11:
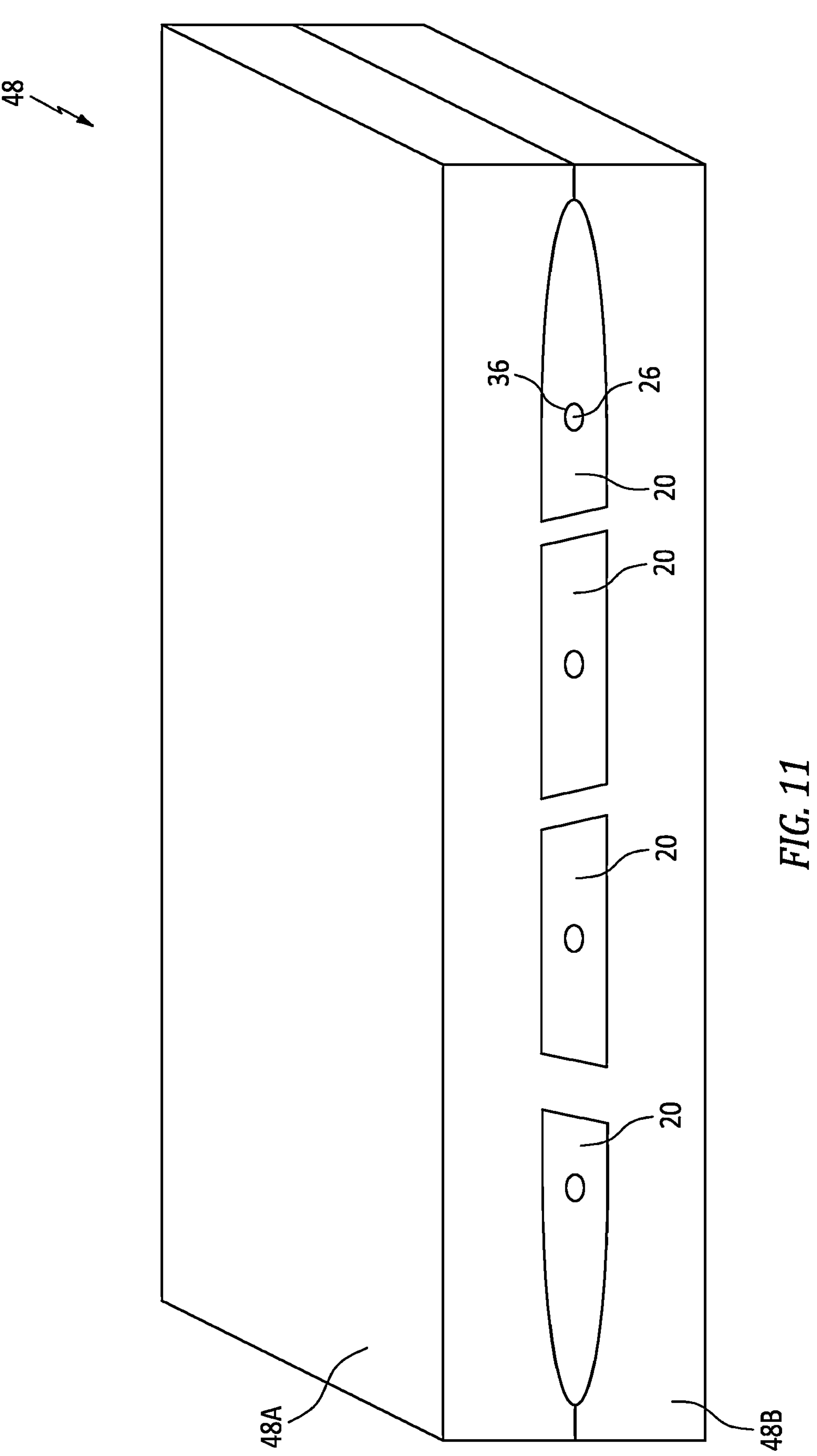
FIG. 11 illustrates an assembly of composite components with the plurality of tooling elements of FIG. 10, in accordance with one or more embodiments of the present disclosure.

Step 904 includes supporting the at least one composite component 48 by positioning the at least one tooling element 20 in contact with the at least one composite component 48. As shown in FIG. 11, for example, a first composite component 48A and a second composite component 48B may be positioned relative to one another so as to define the desired shape and configuration of the composite structure 50. The at least one tooling element 20 may be positioned within (e.g., as "trapped tooling") or otherwise in contact with the composite components 48A, 48B to support the composite components 48A, 48B during a subsequent curing process.

Step 906 includes curing the at least one composite component 48, 48A, 48B to form the composite structure 50. Curing the at least one composite component 48, 48A, 48B may include heating the assembled at least one composite component 48, 48A, 48B to an elevated temperature and holding the at least one composite component 48, 48A, 48B at the elevated temperature for a sufficient time to cure the at least one composite component 48, 48A, 48B. Various temperatures, pressure, and curing times may be used, depending on the materials selected for the at least one composite component 48, 48A, 48B. The at least one composite component 48, 48A, 48B may be cured, for example, in an oven or autoclave. The present disclosure is not limited to any particular curing temperatures, pressures, curing times, or equipment. In the cured state, the at least one composite component 48, 48A, 48B form the composite structure 50.

After curing the at least one composite component 48, 48A, 48B to form the composite structure 50, the at least one tooling element 20 may be tightly retained within the composite structure 50 such that direct removal of the at least one tooling element 20 from the composite structure 50 is difficult or impossible or presents the risk of damage to the composite structure 50. Step 908 includes unsealing the at least one tooling element 20, subsequent to curing the at least one composite component 48, 48A, 48B. The at least one tooling element 20 may be unsealed, for example, by removing the access port seal 26 from the access port 36 or by actuating the air valve 52 of the access port seal 26 to allow the reintroduction of air to the interior cavity 34 of the sleeve 22 (see FIG. 1). The reintroduction of air to the interior cavity 34 of the at least one tooling element 20 may substantially reduce the rigidity of the at least one tooling element 20, thereby allowing the at least one tooling element 20 to be withdrawn from the composite structure 50. In some embodiments, step 908 may further include removing at least a portion of the tooling particulate 24 from the interior cavity 34 of the at least one tooling element 20. Removal of a portion of the tooling particulate 24 may further reduce the rigidity of the at least one tooling element 20 as well as decreasing the size of the at least one tooling element 20 and, hence, the contact pressure between the at least one tooling element 20 and the composite structure 50. In some embodiments, the tooling particulate 24 removed from the at least one tooling element 20 may be collected for reuse in subsequently formed tooling elements 20.

Figure 12:
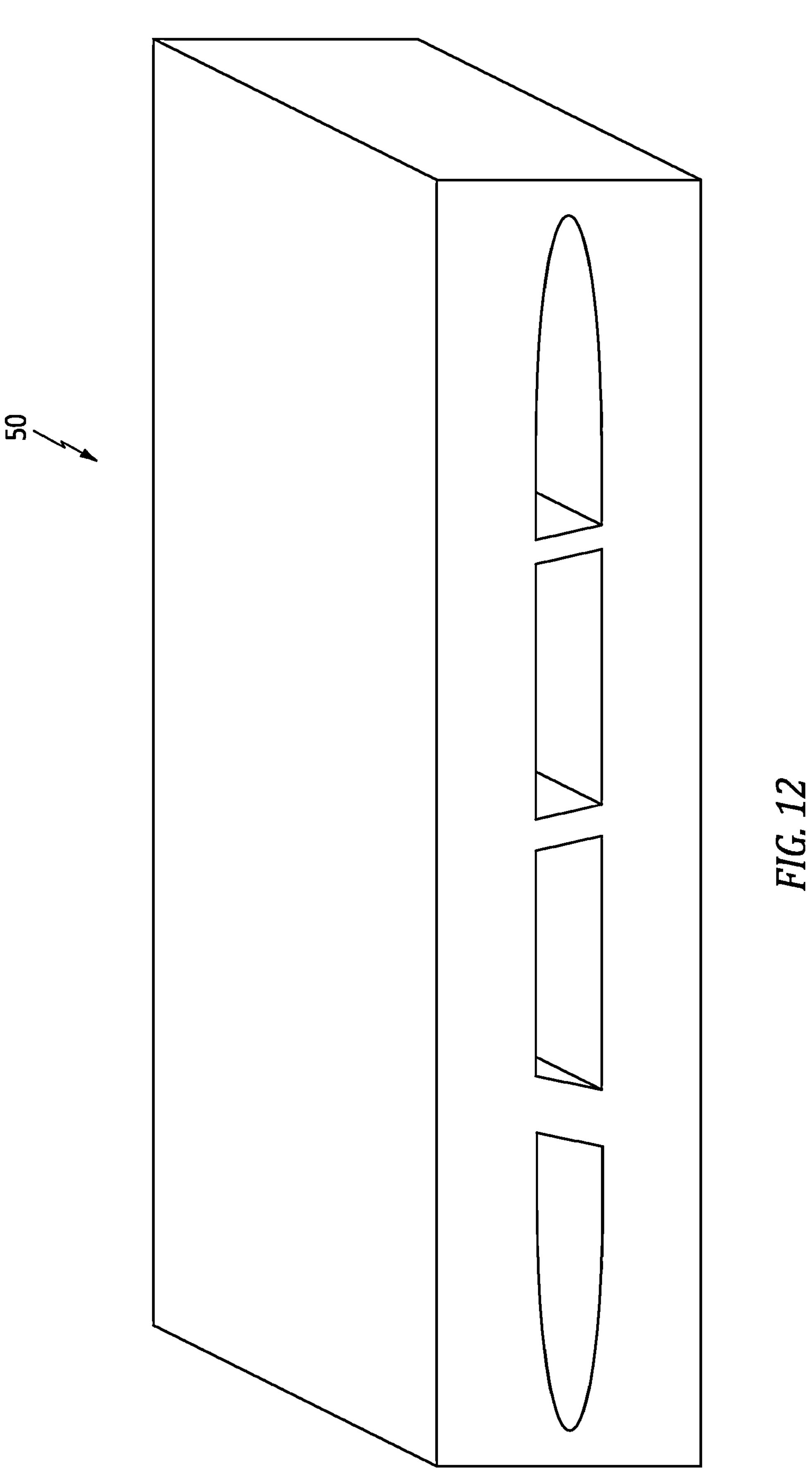
FIG. 12 illustrates the composite components of FIG. 11 in a cured state with the plurality of tooling elements removed, in accordance with one or more embodiments of the present disclosure.

Step 910 includes removing the at least one tooling element 20 from contact with the composite structure 50, subsequent the performance of step 908, as shown in FIG. 12, for example.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A method for forming a composite structure, the method comprising:

providing at least one tooling element comprising:

a flexible sleeve defining an interior cavity, the flexible sleeve comprising a sealable access port extending through the flexible sleeve from the interior cavity to an exterior of the flexible sleeve; and vacuum-packed tooling particulate disposed within and filling the interior cavity of the flexible sleeve, providing the at least one tooling element including the steps of:

inserting a rigid support sheet into the interior cavity of the flexible sleeve, in contact with the flexible sleeve, to form and support a tooling face of the flexible sleeve;

packing the flexible sleeve with the tooling particulate, subsequent to inserting the rigid support sheet, by inserting the tooling particulate into the interior cavity of the flexible sleeve through a sealable access port; and removing air from the interior cavity of the flexible sleeve through the sealable access port to form the tooling element as a rigid tooling structure;

supporting at least one composite component by positioning the at least one tooling element in contact with the at least one composite component; and curing the at least one composite component to form the composite structure.

2. The method of claim 1, further comprising unsealing the at least one tooling element and removing at least a portion of the tooling particulate subsequent to the step of curing the at least one composite component.

3. The method of claim 2, further comprising removing the at least one tooling element from contact with the composite structure subsequent to the step of unsealing the at least one tooling element and removing at least a portion of the tooling particulate.

4. The method of claim 1, wherein the tooling particulate comprises a first tooling particulate and a second tooling particulate which is different than the first tooling particulate.

5. The method of claim 4, wherein the first tooling particulate has a first density and the second tooling particulate has a second density which is different than the first density.

6. The method of claim 1, wherein the tooling particulate comprises one or more hollow geometric vessels.

7. The method of claim 1, wherein the tooling particulate comprises one or more expandable balloons.

8. The method of claim 1, wherein the flexible sleeve is a rubber sleeve.

9. The method of claim 1, wherein the interior cavity of the flexible sleeve is substantially free of air subsequent to removing air from the interior cavity of the flexible sleeve through the sealable access port to form the tooling element as a rigid tooling structure.

10. The method of claim 1, wherein the at least one tooling element further includes an access port seal disposed within the sealable access port.

11. The method of claim 1, wherein providing the at least one tooling element further includes sealing the sealable access port with an access port seal subsequent to removing air from the interior cavity of the flexible sleeve through the sealable access port to form the tooling element as a rigid tooling structure.

12. The method of claim 1, wherein the step of packing the flexible sleeve with the tooling particulate includes applying vibration to the flexible sleeve.

13. The method of claim 1, wherein providing the at least one tooling element further includes positioning the flexible sleeve within a tooling mold prior to the step of packing the flexible sleeve with the tooling particulate.

14. The method of claim 13, wherein the at least one composite component forms the tooling mold.

* * * * *